United States Patent [19]

Huckabee et al.

[11] Patent Number: 5,049,530
[45] Date of Patent: Sep. 17, 1991

[54] POWER MIXTURE AND GREEN BODY FOR PRODUCING SILICON NITRIDE BASE & ARTICLES OF HIGH FRACTURE TOUGHNESS AND STRENGTH

[75] Inventors: Marvin L. Huckabee, Marlboro; Sergej-Tomislav Buljan; Jeffrey T. Neil, both of Acton, all of Mass.

[73] Assignee: GTE Laboratories Incorporated, Waltham, Mass.

[21] Appl. No.: 596,256

[22] Filed: Oct. 12, 1990

Related U.S. Application Data

[62] Division of Ser. No. 458,122, Dec. 28, 1989.

[51] Int. Cl.$^5$ ............ C04B 35/58; C04B 35/82
[52] U.S. Cl. ............................. 501/97; 501/95; 501/87; 501/92
[58] Field of Search ............. 501/95, 97, 87, 92

[56] References Cited

U.S. PATENT DOCUMENTS

| | | | |
|---|---|---|---|
| 4,073,845 | 2/1978 | Buljan | 501/97 |
| 4,218,254 | 8/1980 | Kiehl et al. | 501/92 |
| 4,671,912 | 6/1987 | Komatsu et al. | 501/97 |
| 4,693,988 | 9/1987 | Boecker et al. | 501/97 |
| 4,704,242 | 11/1987 | Bandyopadhyay | 264/63 |
| 4,840,763 | 6/1989 | Freitag | 501/95 |
| 4,888,310 | 12/1989 | Richon | 501/95 |

OTHER PUBLICATIONS

Ube Industries, Ltd., "Silicon Nitride Technical Report, Data Sheet", Effect of Binary Powder Mixing.

*Primary Examiner*—William R. Dixon, Jr.
*Assistant Examiner*—C. Melissa Bonner
*Attorney, Agent, or Firm*—Frances P. Craig

[57] ABSTRACT

A powder mixture and a green body for producing a silicon nitride-based article of improved fracture toughness and strength. The powder mixture includes 9a) a bimodal silicon nitride powder blend consisting essentially of about 10-30% by weight of a first silicon nitride powder of an average particle size of about 0.2 $\mu$m and a surface area of about 8-12m$^2$g, and about 70-90% by weight of a second silicon nitride powder of an average particle size of about 0.4-0.6 $\mu$m and a surface area of about 2-4 m$^2$/g, (b) about 10-50 percent by volume, based on the volume of the densified article, of refractory whiskers or fibers having an aspect ratio of about 3-150 and having an equivalent diameter selected to produce in the densified articel an equivalent diameter ratio of the whiskers or fibers to grains of silicon nitride of greater than 1.0, and (c) an effective amount of a suitable oxide densification aid. The green body is formed from the powder mixture, an effective amount of a suitable oxide densification aid, and an effective amount of a suitable organic binder.

3 Claims, No Drawings

1 …  … 2 …

POWER MIXTURE AND GREEN BODY FOR PRODUCING SILICON NITRIDE BASE & ARTICLES OF HIGH FRACTURE TOUGHNESS AND STRENGTH

CONTRACT INFORMATION

This invention was made as a result of work under Contract No. DE-AC05-840R21400 between the U.S. Department of Energy and Martin Marietta Energy Systems, Subcontract No. 86X-22011C to GTE Laboratories Incorporated. The Government has certain rights in this invention.

This is a divisional of copending application Ser. No. 07/458,122, filed on Dec. 28, 1989, pending.

BACKGROUND OF THE INVENTION

This invention relates to fracture and abrasion resistant materials; more particularly, it is concerned with a process for the production of silicon nitride based ceramic bodies exhibiting improved fracture toughness and strength.

In pursuing a goal of development of new, tougher ceramics for use in demanding, high temperature structural applications, numerous attempts have been made to toughen silicon nitride by the dispersion of particles, whiskers, or fibers in ceramics as reinforcing material. In certain cases these composites exhibit modest improvement in strength along with an increase in toughness, but more often any increase in toughness is achieved at the expense of a reduction in strength.

The present invention is directed to a process for producing composite silicon nitride bodies of a bimodal composite material including whiskers or fibers and a blend of fine and coarse silicon nitride powders. The process consistently yields a material of high fracture toughness and strength above those of state-of-the-art materials, and well above those of composite materials made from either the fine or the coarse silicon nitride materials alone. This achievement of improved fracture toughness and strength is unexpected, since Ube Industries, Ltd. of Tokyo, Japan have reported the sintering of a binary powder mix to form a monolithic silicon nitride body which exhibits fracture toughness and strength, e.g. at 20 percent by weight fine silicon nitride powder of average diameter about 0.18 $\mu$m and 80 percent by weight 1.89 $\mu$m coarse powder, lower than those of a similar material containing 100 percent fine powder.

SUMMARY OF THE INVENTION

A powder mixture in accordance with one aspect of the invention for producing a densified silicon nitride-based article includes (A) a powder blend consisting essentially of about 10–30 percent by weight of a first silicon nitride powder of an average particle size of about 0.2 $\mu$m and a surface area of about 8–12 m$^2$/g, and about 70–90 percent by weight of a second silicon nitride powder of an average particle size of about 0.4–0.6 $\mu$m and a surface area of about 2–4 m$^2$/g and (b) about 10–50 percent by volume, based on the volume of the densified article, of refractory whiskers or fibers having an aspect ratio of about 3–150 and an equivalent diameter selected to produce in the densified article an equivalent diameter ratio of the whiskers or fibers to grains of silicon nitride of greater than 1.0.

In a narrower aspect, the powder mixture further includes a suitable oxide densification aid in an amount sufficient to permit full densification in the densified article.

A green body in accordance with another aspect of the invention for producing a densified silicon nitride-based article is formed from a mixture comprising (a) a silicon nitride powder blend consisting essentially of about 10–30 percent by weight of a first silicon nitride powder of an average particle size of about 0.2 $\mu$m and a surface area of about 8–12 m$^2$/g and about 70–90 percent by weight of a second silicon nitride powder of an average particle size of about 0.4–0.6 $\mu$m and a surface area of about 2–4 m$^2$/g, (b) an effective amount of a suitable oxide densification aid, (c) about 10–50 percent by volume, based on the volume of a densified article produced from the green body, of refractory whiskers or fibers having an aspect ratio of about 3–150 and an equivalent diameter selected to produce in the densified article an equivalent diameter ratio of the whiskers or fibers to grains of silicon nitride of greater than 1.0, and (d) an effective amount of a suitable organic binder.

DETAILED DESCRIPTION OF THE PREFERRED EMBODIMENTS

For a better understanding of the present invention, together with objects, advantages and capabilities thereof, reference is made to the following Description and appended Claims.

The process according to the present invention for obtaining a high strength, high toughness silicon nitride based composite body involves the use of a starting formulation including a bimodal composite mixture, in which the starting silicon nitride powder must be a blend having a bimodal distribution of particle sizes. In a typical process, this is achieved by thorough blending of 10–30% by weight of a silicon nitride powder with a surface area of about 8–12 m$^2$/g and an average particle size of 0.2 $\mu$m with a corresponding 90–70% by weight of a silicon nitride powder having a surface area of about 2–4 m$^2$/g and an average particle size of 0.4–0.6 $\mu$m.

The bimodal silicon nitride powder blend is mixed with refractory whiskers or fibers in an amount of about 10–50% by volume of refractory whiskers or fibers, based on the total volume of the ceramic body. The whiskers or fibers may be selected from, for example, any of those known to increase toughness. Suitable materials include, for example, the refractory carbides, nitrides, oxides, and borides of silicon, aluminum, or metals of Groups IIIB, IVB, VB, and VIB of the Periodic Table of the Elements. The whiskers or fibers preferably are evenly dispersed throughout the ceramic body. The preferred whiskers or fibers have an aspect ratio of about 3–150, and the fibers may be in the form of chopped fibers, if desired. The equivalent diameters of the whiskers or fibers, relative to the silicon nitride in the blended powder mixture, and the densification time are selected to produce a fully dense ceramic body in which the equivalent diameter of the whiskers or fibers is greater than that of the silicon nitride grains, which in the densified body are the beta form. The term "equivalent diameter", as used herein, refers to the diameter of a spherical body of the same volume as the particle, whisker, or fiber in question.

Preferably, this bimodal composite mixture also includes about 0.5–12% by weight of one or more suitable oxide densification aids, based on the combined weight of the densification aid and the silicon nitride blend. This mixture is then densified to near theoretical density, preferably to a density greater than about 98% of theoretical density to produce the high strength, high toughness silicon nitride based body.

The densification aid may be any of those known to effectively densify silicon nitride materials to near theoretical density without detrimentally affecting the high temperature strength and creep resistance of the overall body, for example an oxide of yttrium, aluminum, zirconium, hafnium, silicon, magnesium, or the lanthanide rare earth metals, or a combination of these. Typically, the densification aid is added in an amount between a lower effective amount which will permit full densification to an upper amount which does not unduly detrimentally affect the high temperature strength and creep resistance of the body. Preferably, the amount of densification aid added is about 0.5–25 percent by weight. The preferred homogeneous mixing may be accomplished, for example, by ball milling in a non-reactive medium such as toluene or methanol.

In a typical densification step, the bimodal composite mixture is shaped and densified by pressure assisted sintering, for example in known manner in a nitrogen atmosphere at about 1650°–1900° C. and about 3–30,000 psi for a time sufficient to produce a body of near theoretical density. Alternatively, the body may be densified by other methods, e.g. known hot pressing or hot isostatic pressing methods.

In a preferred process, the blended bimodal composite powder mixture is mixed with an effective amount of a suitable binder, for example an organic binder such as a paraffin wax, and molded to form a green body. Typically, the binder is added in an amount of 34–42 percent by volume of the mixture. The molding of the ceramic mixture may be accomplished, for example, by injection molding, pressing, extruding, or slip casting. Most preferably, injection molding is used to shape the green body. Other materials may be added to the mixture but are optional, for example known injection molding formulation additives such as surfactants, thermosetting materials, or the like. The binder is burned out and the green body is densified, preferably by encapsulating the body in a glass and hot isostatic pressing the body to full, i.e. near theoretical, density.

In the most preferred burn out process, described in commonly assigned U.S. Pat. No. 4,704,242 which is incorporated herein by reference, the green body is embedded in a setter powder and heated in a non-oxidizing atmosphere, e.g. nitrogen, up to a temperature of about 450° C. to completely remove the binder. During the initial heating to about 400° C., at a rate of at least 1° C./hr and preferably at least 10° C./hr, about 15–20 percent by weight of the binder is removed, and the setter powder forms a thick cake encapsulating the part. The thick cake then prevents further loss of binder during further heating until a sufficiently high midrange temperature is reached, about 400°–450° C., breaking down the thick cake barrier by thermal decomposition and effecting vaporization of the binder. Typically, the heating to midrange temperature takes about 0.5–1 hr. Thus, the majority of the binder loss occurs after the midrange temperature is reached. The temperature is then raised to about 600° C. and held for about 8–20 hr in air or other oxidizing atmosphere to remove from the part any residual binder or carbon resulting from binder decomposition. Preferably, the hot isostatic pressing is carried out at about 1825° C. for about 90 min. at about 207 MPa, although the pressure level is not critical.

The following Examples are presented to enable those skilled in the art to more clearly understand and practice the present invention. These Examples should not be considered as a limitation upon the scope of the present invention, but merely as being illustrative and representative thereof.

EXAMPLE 1

Twenty (20) percent by weight of silicon nitride powder with a surface area of 10.46 m$^2$/g and 80 percent by weight of silicon nitride powder with a surface area of 3.80 m$^2$/g were mixed to form a bimodal mixture, then were thoroughly blended with 1.5 percent by weight alumina and 6 percent by weight yttria and ball milled for 36 hr using silicon nitride milling media. This blend was then thoroughly mixed with 30 percent by volume of silicon carbide whiskers, based on the expected volume of the densified product, using a high shear blender. An amount of 53.4 g of this mixture was then densified to near theoretical density by hot pressing at 3500 psi and 1800° C. in nitrogen atmosphere for 400 min to form a densified body in the shape of a right circular cylinder. Two control samples were prepared in an identical manner using each of the individual component silicon nitride powders in place of the bimodal mixture, single mode mixture 1 being made from the coarser powder, and single mode mixture 2 from the finer powder. The properties of the densified bodies are shown below in the Table.

TABLE

| Powder Mixture | Avg. Particle Size (μm) | Surface Area (m$^2$/g) | $K_{IC}$ (MPa · m$^{\frac{1}{2}}$) | MOR (MPa) | Density (% Theor.) |
|---|---|---|---|---|---|
| Bimodal Mix (Hot Pressed) | 0.37 | 5.13 | 7.3 ± 0.6 | 1043 ± 50 | 100 |
| Single Mode (Hot Pressed) | | | | | |
| Mix 1 | 0.47 | 4.0 | 6.0 ± 0.6 | 880 ± 101 | 99.9 |
| Mix 2 | 0.17 | 10.46 | 6.9 ± 0.3 | 913 ± 47 | 99.4 |
| Bimodal Mix (Injn. M. & HIPed) | 0.37 | 5.13 | 6.9 ± 0.4 | 1143 ± 48 | 98.4 |

As seen in the Table above, bodies prepared in this manner exhibit mechanical properties superior to those of similar bodies prepared from either of the single mode particle distribution component powders.

EXAMPLE 2

Twenty (20) percent by weight of silicon nitride powder with a surface area of 10.46 m$^2$/g and 80 percent by weight of silicon nitride powder with a surface area of 3.80 m$^2$/g were mixed to form a bimodal mixture, then were thoroughly blended with 1.5 percent by weight alumina and 6 percent by weight yttria. This blend was ball milled for 36 hr using silicon nitride milling media. The resulting powder mixture was then thoroughly mixed with 30 percent by volume silicon carbide whiskers, based on the expected volume of the densified product, using a high shear blender. An amount of 510 g of this mixture was then combined with 83.3 g of an organic binder to achieve a blend comprised of 63 volume percent ceramic and 27 volume percent binder. The powder/binder mixture was injection molded to form a green body in the shape of a rectangular bar. The organic binder was burned out by heating the green body for 8 hr at 600° C. The cooled green body was encapsulated in a glass, and was densified by hot isostatic pressing at 30,000 psi and 1825° C. for 90 minutes. A control sample was prepared in an identical manner using the coarser of the individual component silicon nitride powders in place of the bimodal mixture. The properties of the densified bodies are shown above in the Table.

As can be seen from the above Examples, the process according to the invention yields densified ceramic bodies which are hard and nonporous, and which exhibit extraordinary fracture toughness and strength, higher than that of silicon nitride prepared by conventional processing. Improvements such as these could not be predicted from the established knowledge and observed trends in the art. These bodies are useful for applications which include, but are not limited to, milling tools, extrusion dies, nozzles, dies, bearings, and wear-resistant structural parts, and are especially useful as ceramic components for heat engines.

While there has been shown and described what are at present considered the preferred embodiments of the invention, it will be obvious to those skilled in the art that various changes and modifications can be made therein without departing from the scope of the invention as defined by the appended Claims.

We claim:

1. A powder mixture for producing a densified silicon nitride-based article, said mixture comprising:
   a powder blend consisting essentially of about 10–30 percent by weight of a first silicon nitride powder of an average particle size of about 0.2 μm and a surface area of about 8–12 m²/g, and about 70–90 percent by weight of a second silicon nitride powder of an average particle size of about 0.4–0.6 μm and a surface area of about 2–4 m²/g; and
   about 10–50 percent by volume, based on the volume of said densified article, of refractory whiskers or fibers having an aspect ratio of about 3–150 and having an equivalent diameter selected to produce in said densified article an equivalent diameter ratio of said whiskers or fibers to grains of silicon nitride of greater than 1.0.

2. A powder mixture in accordance with claim 1 further comprising a suitable oxide densification aid in an amount sufficient to permit full densification of the article.

3. A silicon nitride green body formed from a mixture comprising:
   a silicon nitride powder blend consisting essentially of about 10–30 percent by weight of a first silicon nitride powder of an average particle size of about 0.2 μm and a surface area of about 8–12 m²/g and about 70–90 percent by weight of a second silicon nitride powder of an average particle size of about 0.4–0.6 μm and a surface are of about 2–4 m²/g;
   an effective amount of a suitable oxide densification aid;
   about 10–50 percent by volume, based on the volume of a densified article produced from said green body, of refractory whiskers or fibers having an aspect ratio of about 3–150 and having an equivalent diameter selected to produce in said article an equivalent diameter ratio of said whiskers or fibers to grains of silicon nitride of greater than 1.0; and
   an effective amount of a suitable organic binder.

* * * * *